Figure 1:
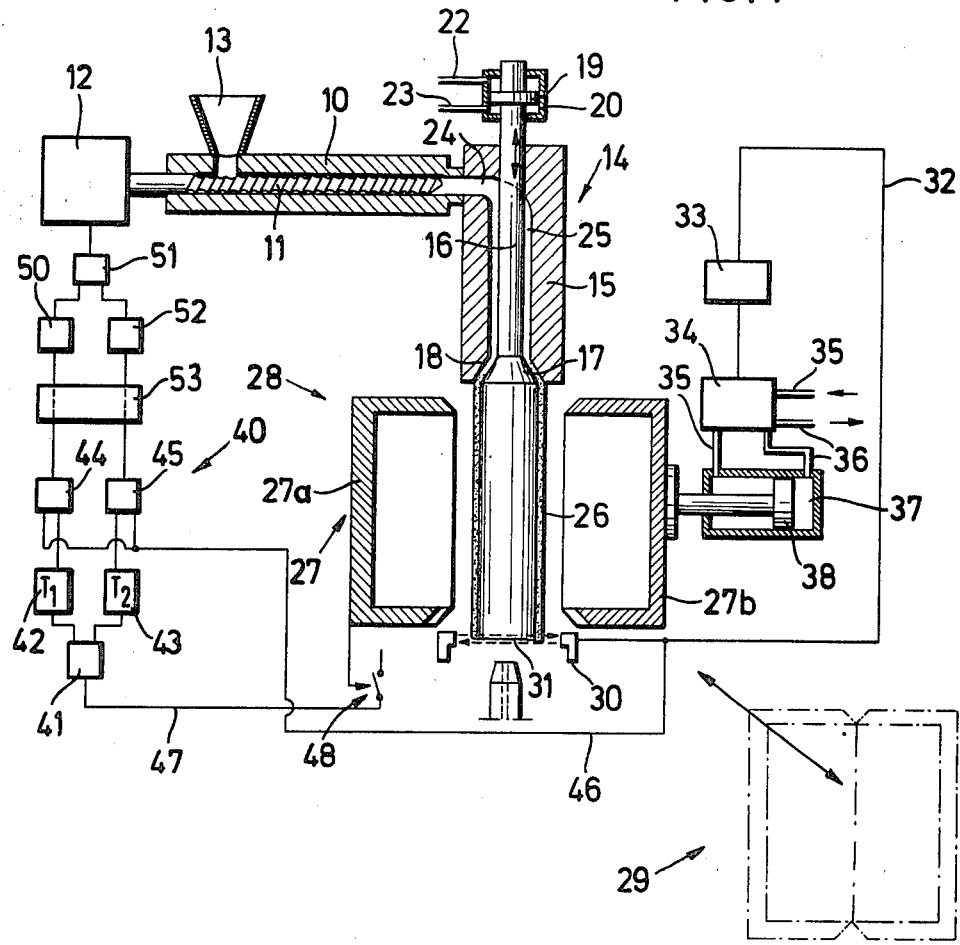

United States Patent [19]

Daubenbüschel et al.

[11] 4,094,620
[45] June 13, 1978

[54] APPARATUS FOR THE MANUFACTURE OF HOLLOW BODIES OF A THERMOPLASTIC BY BLOW-MOULDING

[75] Inventors: Werner Daubenbüschel, Bensberg-Refrath; Alfred Thomas, Dambroich; Dieter Hess, Swistal-Morenhoven; Hans-Rüdiger Augst, Windeck, all of Germany

[73] Assignee: Kautex Maschinenbau GmbH, Bonn-Holzlar, Germany

[21] Appl. No.: 728,642

[22] Filed: Oct. 1, 1976

[30] Foreign Application Priority Data

Oct. 3, 1975 Germany ............................. 2544171

[51] Int. Cl.² .............................................. B29D 23/04
[52] U.S. Cl. .................................... 425/140; 425/147; 425/155
[58] Field of Search ............... 425/140, 145, 147, 150, 425/326 B, DIG. 206, DIG. 231, 532, 155

[56] References Cited

U.S. PATENT DOCUMENTS

| | | | |
|---|---|---|---|
| 3,594,861 | 7/1971 | Fischer et al. | 425/326 B |
| 3,759,648 | 9/1973 | Hunkar | 425/326 B |
| 3,943,214 | 3/1976 | Turek | 425/DIG. 231 |
| 3,970,418 | 7/1976 | Turek | 425/DIG. 231 |

Primary Examiner—Richard B. Lazarus
Attorney, Agent, or Firm—Laurence R. Brown

[57] ABSTRACT

Blow molding apparatus for the manufacture of hollow bodies from a thermoplastic, in which a screw-extruder forms a parison into a receiving station. A blow mold is movable to and fro between the receiving station and a mold release station, the blow mold consisting of at least two parts which can be opened so that the blow mold encompasses the parison in the receiving station. The length of the parison extruded is detected when it reaches a given length corresponding to the length of the mold. Control means are provided, these being operable only by the means for detecting the parison length, and cause the mold parts to close on the parison. Time dependent open-loop control means control the movement of the blow-mold so that it is in the open position in the receiving station before the length of the parison has reached the given length, so that it is ready to close immediately the given length is reached.

5 Claims, 2 Drawing Figures

APPARATUS FOR THE MANUFACTURE OF HOLLOW BODIES OF A THERMOPLASTIC BY BLOW-MOULDING

The present invention relates to blow-moulding apparatus for the manufacture of hollow bodies from a thermoplastic.

One form of such apparatus includes a blow-mould, consisting of two or more parts, which can be moved to and fro between a receiving station, located at the position of the die head of an extruder, and a mould release station, and a closed loop control device for controlling the speed of the screw of the extruder as a function of the rate of extrusion of parisons from the extruder, and a device which senses the length of the parisons, and a device for the time-dependent open loop control of the movements of the blow-mould and of its part.

In such an apparatus, the thermo-plastic is continuously extruded from the extrusion head. The blow-mould which is initially underneath the extrusion head, in the receiving station, receives the parison hanging from the extrusion head, after which the blow-mould, which has now been closed, is moved to the mould release station. During this movement and/or whilst the mould is in the mould release station, the parison is blown to form the finished hollow body. After this has adequately solidified, the blow mould is opened in order to remove the hollow body. The opened blow-mould is then again moved back into the receiving station, to receive the next parison, which has been extruded in the interim, for the manufacture of the next hollow body. With this method of working it is necessary that the manufacture of the parisons, on the one hand, and the movements of the blow-mould, on the other, should be matched with one another in order to achieve optimum output and minimum waste.

It is possible, without difficulty, for example by using a time-dependent open loop control system to control the movements of the blow-mould so accurately that the mould is always below the extrusion head, in order to receive a parison, at a particular moment. However, it is by no means certain that a parison of the desired length will be present, hanging from the extrusion head, in the receiving station, precisely at this moment. Rather, fluctuations of extrusion rate are unavoidable, so that, within identical periods of time, parisons of different length are extruded, and, furthermore, taken up by the blow-mould if the latter is moved in accordance with a rigid time schedule. If the tube lengths vary, the parisons — should they deviate from the intended length — are either too short, so that acrap may possibly be produced, or too long, in which case the waste portion is too large. Furthermore, there is the danger when using programmed closed loop control of the wall thickness of the parison, the zones having a particular wall thickness will not occupy their correct position relative to the blow-mould.

It is known to sense the length of the parison, for example by means of a photocell, and to convert the particular results into signals or the like which are used to trigger the movements of the blow-mould and of its parts. However, this has the disadvantage that even if all other sequences, or all essential other sequences, are controlled as a function of time, the irregular running of the extruder will ultimately determine the mode of operation of the entire apparatus.

Another device, disclosed by U.S. Pat. No. 3,759,648, provides using the results of monitoring the parison by a photocell for the purpose of the closed loop control of the speed of the extruder screw and hence of the rate of output of the latter. It is true that this device avoids excessive fluctuations as regards the rate of output. However, it suffers from the disadvantage that, as before, the length of the parisons successively received by the blow-mould is variable. In addition, this known device is set to a mean parison length which must be greater than is necessary for the production of a perfect finished product. This is due to the fact that otherwise, — should the length of the parison be less than the set value — the parison would be too short to permit the production of a usable finished article.

This last-mentioned disadvantage is avoided, in another device which serves to regulate the length of the parison, by a deviation from the intended length producing, not only a change in the extruder speed, but also an adaption of the cycle time of the blow-mould movements. In detail, this device operates through a light beam, associated with a photocell for sensing the length of the extruded parison. If the length is correct, the end of the parison reaches the light barrier precisely at the intended time, to which the timer or timing pulse generator of the machine is set. The associated photocell triggers a signal, the end result of which is that the blow-mould is moved from its starting position to the receiving position and is subsequently closed. In the event of a deviation from the set length of the parison, the extruder speed is subjected to closed loop control. In addition, however, the device ensures that the movement of the blow-mould, at the end of which the mold takes over the generally tubular parison, only commences when the tube has an adequate length. This means that if the extrusion rate is too low, the movement of the blow-mould is delayed until the set minimum tube length is reached. A disadvantage of this known device is that the blow-mould receives the signal to take up the parison when the mould is still in the mould release station. This means that the mould must first travel the distance between the mould release station and the receiving station before the mould can be closed. It is thus necessary that the parison issuing from the extrusion head should be scanned by the light beam at a relatively early point in time, in order to take into account the time which additionally elapses until the mould is finally closed. With the customary cycle times of medium-size blow-moulding machines, this means that at the moment at which the parison is scanned by the light beam, the length of the parison is approximately from 60 to 70% of the set length. Any changes of the extrusion rate, the hence of the rate at which the parison is formed, which take place after the moment at which the parison is sensed by the light barrier, and which thus fall within the remaining 30 to 40% of the time of formation of the parison, are thus no longer sensed. It is thus possible for irregularities to occur, in spite of this monitoring, which furthermore are accentuated by the fact that because of the early point in time at which the length of the parison is sensed, it is also only possible to record, and utilise for open loop control, about 60 to 70% of the total running time of the extruder. The operating conditions of the extruder for the remaining 30 to 40% of the running time are left completely out of consideration.

According to the present invention there is provided blow-moulding apparatus for the manufacture of hollow bodies from a thermoplastic material, such apparatus comprising a screw extruder for forming a parison, a receiving station into which the parison is extruded, a mould release station spaced from the receiving station, a blow-mould consisting of at least two openable parts, the blow-mould being movable to and fro between the receiving station and the mould release station, the open blow-mould encompassing the parison in the receiving station, means for detecting when the length of the parison extruded reaches a given length corresponding to the length of the blow-mould control means operable only by said detecting means when the mould is at the receiving station to close the mould parts on the parison and time dependent open-loop control means which control the movement of the blow-mould so that it is in the open position in the receiving station before the length of the parison reaches said given length.

With such a construction it is possible to ensure that the blow-mould should close in every case, that is to say even when the extruder has too high an output, when the parison has reached its given length. It is also possible so to control the extruder, that is to say the extruder screw speed, that deviations from the intended output are correctly recorded and can thus also be immediately and correctly taken into account in the open loop control sequences. It is further possible to record a longer portion of the operation of the extruder, and at the same time to reduce the time interval between recording or measurement and the final closing of the blow-mould.

The invention thus ensures that the signal which triggers the movement of the blow-mould or of its parts in order to receive the parison is exclusively brought about by the parison, with the mould in the receiving station. As a result, the point in time at which the parison reaches its intended length and the point in time at which the blow-mould is closed virtually coincide. In any case, the time interval between these two events is so short that it does not matter for practical purposes. Furthermore, in many cases the time interval can be reduced to a minimum if the blow-mould is in an already partially closed position when it receives the closing signal. This is possible in normal cases because the diameter of the generally tubular parison is substantially less than the largest diameter of the product to be manufactured therefrom. A further advantage of the teaching of the invention is that virtually the entire operating sequence of the extruder is monitored and can thus be utilised for the open loop control of the screw speed.

In an embodiment which has provided particularly advantageous, a waiting period is planned into the sequence of movement of the blow-mould, which sequence is otherwise entirely or predominantly controllable as a function of time, so that the mould reaches the receiving station a short time before the set point in time at which the parison is intended to have reached its set length. The short time interval before the set point in time takes into account the possibility that the parison may be extruded at too high a speed and thus reaches its set length earlier than the set point in time. In that case, the blow-mould is also closed correspondingly earlier so that in every case increased material consumption is avoided and regions of different wall thickness which may be present over the length of the parison occupy the correct position relative to the blow-mould. If the output rate is too low and has the effect that the parison only reaches its set length after the set point in time, the closing sequence of the blow-mould is delayed correspondingly. At the same time, the arrangement made can be such that, in a manner which is in itself known, deviations in the time required for the formation of the parison are disregarded if they fall within a given time tolerance. If the actual value is greater or less than this tolerance range, a change of the screw speed is produced. In that case, the degree of change of the screw speed can be dependent on the degree of deviation of the point in time, at which the given length of the parison is reached, from the set point in time which corresponds to rigid time control of the cycle of movements of the blow-mould.

The planned waiting time can, without difficulty, be kept so short that it virtually does not detract from the output of the apparatus. The absolute length of the waiting time will also depend on the size of the particular apparatus and accordingly on the size of the hollow bodies to be manufactured, since, in general, the time required for a cycle increases as the parison, and hence the end product, increase in size. The planned waiting time should — as has been mentioned — take into account the fact that absolute uniformity with regard to the time required to form the parison will never be achievable. On the other hand, the apparatus of the invention permits such precise open loop control of the extruder that deviations from the set time as regards the formation of the parison remain low.

Figure 2:
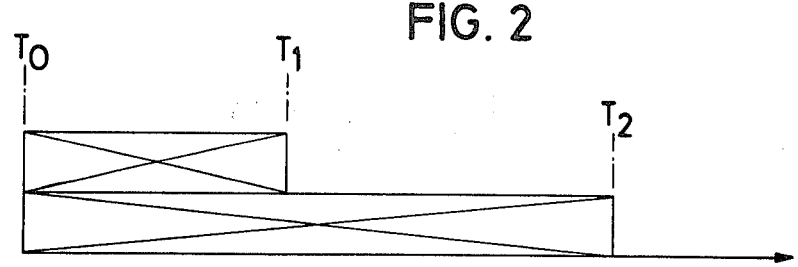

In order that the invention will be more fully understood, the following description is given, merely by way of example, reference being made to the accompanying drawing, in which:

FIG. 1 schematically shows one embodiment of apparatus according to the invention, with its corresponding open loop control equipment; and FIG. 2 shows a diagram which explains the waiting time in the receiving station, interpolated into the cycle of movement of the blow-mould.

The apparatus shown schematically in FIG. 1 comprises an extruder, the screw 11 of which is driven by a motor 12. The thermoplastic material is fed to the extruder from a hopper 13. The extruder 10 is provided with an extrusion head 14 which essentially consists of a cover 15 and a core 16 which can be moved vertically to and fro in the extrusion head 14. The lower region 17 of the core 16 represents the inner boundary of an annular gap 18. In its upper terminal region, the core 16 is provided with a piston 19 travelling in a cylinder 20. The feed and discharge lines for the pressure medium — normally a hydraulic medium — are marked 22 and 23.

The cover 15 of the extrusion head 14 is provided with an inlet orifice 24 for the thermoplastic material coming from the extruder 10, which material, after it has passed the inlet orifice 24, spreads around the core 16 of the extrusion head and flows through a channel 25, which is of annular cross-section and is delimited by the core and the cover 15; this channel 25 merges into the annular gap 18, already mentioned, from which the thermoplastic material issues continuously in the form of a tubular parison 26.

Below the extrusion head 14 is located a blow-mould 27, comprising two parts 27a and 27b, which mould can be moved to and fro between the positions shown in continuous lines in FIG. 1 of the drawing, in which the blow-mould is immediately below the extrusion head 14, in the receiving station, and a mould release station 29. In FIG. 1 of the drawing, the position of the blow-mould in the mould release station is shown in broken lines. The blow-mould 27 is provided with a known device, not shown in the drawing, for supplying the pressure medium, by means of which the parison 26 is blown, in the closed mould, to form the end product. The invention, which does not embrace this latter device, is applicable in every case, that is to say regardless of the specific design of this device for supplying compressed air or some other pressure medium.

On the underside of the blow-mould 27 a photocell 30 is so located that the light beam 31 associated therewith is interrupted by the lower end of the tubular parison 26 as soon as the latter has reached its set length. The photocell 30 is connected by a lead 32 to an open loop control device 33 which controls a valve 34 provided in the feed and discharge lines, 35 and 36, of a cylinder 37. The signal from the photocell 30 causes the piston 38, travelling in the cylinder 37, to be subjected to medium through the line 36, so that the blow-mould is closed. Means by which the movement of the part 27b of the mould, which part is connected to the piston 38, can be transmitted to the part 27a of the mould are known. However, it is also possible to provide the part 27a of the mould with a separate piston-cylinder arrangement which could also be controlled by the open loop control device 33.

The mode of operation of the apparatus is as follows: the thermoplastic material is continuously extruded, through the annular gap 28, in the form of a tubular parison 26. As soon as the parison has reached its set length, the photocell triggers a signal which causes the blow-mould 27 located in the receiving station to close round the parison 26. Thereafter, the blow-mould 27 is moved from the receiving station 22 into the mould release station 29, so that the space underneath the extrusion head 14 becomes free for the formation of the next parison 26. During and/or immediately after the closing of the blow-mould, or only after the said mould has reached the mould release station 29, the parison 26 contained in the mould is blown to form the end product. When this end product, in the form of a hollow body, has adequately cooled and solidified, the blow-mould is opened in the mould release station 29. The finished hollow body, which may possibly carry some waste portions, which can normally be pulled off without difficulty, is removed from the blow-mould.

These events, that is to say the inflation of the parison 31, the cooling of the resulting product, the return movement of the mould 27 from the mould release station 29 into the receiving station 28, or the like, can be controlled entirely or predominantly as a function of time. After the hollow body just produced has been removed from the blow-mould, the parts 27a, 27b of the mould are brought -before, during or after the movement from the mould release station back into the receiving station 28 — into a waiting position, which is shown in FIG. 1. In this, the two parts of the mould are so close to one another that the spacing just suffices to allow the next parison 26 to be received. This position of the parts of the mould has the advantage that the closing stroke which the parts 27a, 27b of the mould still have to execute until the final closed position is reached is very short and requires so little time that the interruption of the light barrier 31 by the parison 26, and the closing of the mould 27, virtually coincide. This means that the length of the parison is only scanned by the photocell 30 when the parison has virtually reached its set length.

During the time interval which is required for blowing the parison 26 to form the finished hollow body, for cooling and removing the said body from the blow-mould, and for moving the mould back from the mould release station 29 into the receiving station 28, the next parison 26 is extruded from the extrusion head 14. The object here is that the time required to form this next parison 26 should as accurately as possible match the time required for the occurrence of the abovementioned events in connection with the manufacture of the finished product. However, in practical operation fluctuations in respect of the amount of material extruded by the extruder are unavoidable. It is thus necessary to take into account the possibility that the parison 26 will reach its set length earlier than envisaged. In that case, the extruder 10 is running too fast. In the converse case, when it runs too slowly, the moment at which the parison 26 reaches its set length is later than envisaged.

In order to take such irregularities into account a waiting time for the mould 27 is planned into the total cycle of the movements executed by the blow-mould 27 and its parts 27a and 27b, when the mould 27 is in the ready position shown in FIG. 1. In the representation in FIG. 2, T1 denotes the intended moment, in a cycle sequence, at which, if the extruder 10 operates absolutely uniformly, the parison 26 has reached its set length and the blow-mould 27 is closed. Since, however, — as has been stated — such a precise sequence of production of the parison 26 is unattainable in practice, the invention provides that the blow-mould 27 has already arrived at its waiting position at the moment T0 (FIG. 2), that is to say a short time before the theoretically correct moment T1, the waiting position being that in which the mould is ready to receive the parison 26. Accordingly, the mould can be closed any time from T0 onwards, as soon as an appropriate signal comes from the photocell 30. Accordingly, if the parison 26 has reached its set length before time T1, the blow-mould 27 can also be closed before the said time. Since — as has also already been mentioned — closing the blow-mould before time T1 means that the extruder 10 is running too fast, a closing of the blow-mould in the time interval between T0 and T1 results in a slowing down of the screw speed.

If the extruder is running more slowly, the blow-mould 27 only closes after time T1. As long as this time is earlier than the time T2 (FIG. 2), there is no effect on the speed of the screw 11. If, however, the moment at which the mould closes is later than the predetermined time T2, the screw speed is increased. The planned time tolerance range T1 to T2, within which there is no effect on the speed of the screw 11, is intended to prevent a change in screw speed occurring in virtually every cycle.

The device 40 used to regulate the speed is shown in FIG. 1 and includes a timer 41, behind which are wired in parallel two time-function elements 42 and 43. The element 42 is set to time T1 and the element 43 to time T2. Each of these two time-function elements is followed by a comparison element 44 and 45 respectively. The two elements 44 and 45 are connected to the photocell 30 by a load 46. The timer 41 is connected by a lead 47 to a switch 48, which is actuated by the blow-mould 27, or one of the parts of the mould, as soon as the blow-mould, at time T0, assumes its waiting position. The sequences which follow the closing sequence can — as already stated — be controlled by a timer. At time T0, at which the blow-mould or its parts assume its or their waiting position, a signal is passed to the timer 41 by the switch 48. On reaching the time T1 preselected in the time-function element 42, the latter passes a signal to the comparison element 44. In the same way, the tim-function element 43 passes a signal to the comparison element 45 when the preselected time T2 is reached. When the signal coming from the photocell 30, which indicates that the parison 26 has reached its set length, arrives later than the preselected time T1 set on the time-function element 42, the extruder speed remains unchanged provided that this signal arrives before the time T2 set on the time-function element 43; this means that in such a case neither of the comparison elements 44, 45 passes a signal to the downstream components. If, however, the signal from the photocell 30 arrives before time T1, the comparison element 44 actuates a switch component, downstream from the said element, which component reduces the speed of the motor 12, which drives the screw 11, via a suitable final control element 51, which may be a motor potentiometer, a servomotor or the like.

If the signal coming from the photocell 30 arrives later than corresponds to the time T2 set on the time-function element, the comparison element 45 produces a signal which acts, via the downstream switch-component 52, on the final control element 51 in such a way that the speed of the motor 12 and hence of the screw 11 is increased. The linking member 53 serves to fix the correction parameter, that is to say the extent by which, in each case, the speed of the motor 12 is reduced or increased on receipt of a signal which brings about a change in speed. Any signals coming from the photocell 30, which arrive between times T1 and T2, have — as already stated — no effect on the speed of the screw.

The core of the extrusion head 14 can be axially movable to and fro, in a known manner, in order to alter the width of the annular gap 18 and thus to influence the wall thickness of the parison 26. Since the relevant open loop control devices which act, via the cylinder 20 and the piston 19 travelling therein, on the core 16, do not form part of the actual invention, they have not been shown in the drawing.

We claim:

1. Blow-moulding apparatus for the manufacture of hollow bodies from a thermoplastic material, said apparatus comprising, in combination:

(a) a screw-extruder for forming a parison;
(b) a receiving station into which said parison is extruded;
(c) a mould release station spaced from said receiving station;
(d) a blow-mould consisting of at least two openable parts, said blow-mould being movable to and fro between said receiving station and said mould release station, the open blow-mould encompassing the parison in the receiving station;
(e) means for detecting when the length of the parison extruded reaches a given length corresponding to the length of the blow-mould;
(f) control means operable only by said detecting means when the mould is at said receiving station, effective to close the mould parts on the parison;
(g) time-dependent open-loop control means effective to control the movement of the blow-mould, whereby it is in the open position in said receiving station before the length of said parison reaches said given length; and
(h) means for controlling the speed of the screw of the screw-extruder with a change of speed proportional to a change of time outside a predetermined range of times at which the parison reaches said given length, whereby the time for each mould cycle remains within said range.

2. Blow-moulding apparatus as claimed in claim 1, wherein the parts of the blow-mould, in their initial position on arrival at the receiving station, are separated by less than their maximum spacing.

3. Blow-moulding apparatus as claimed in claim 1, wherein the control means are such that the cycle of movements of the parts of the apparatus are at least predominantly time-controlled, and the waiting time of the blow-mould in the receiving station is planned into the cycle of movements.

4. Blow-moulding apparatus as claimed in claim 1, wherein the means for detecting the length of the parison is mounted on the blow-mould on the side thereof remote from the screw extruder.

5. Blow-moulding apparatus as claimed in claim 4, wherein the detecting means comprise means for producing a beam of light transverse to the direction of extrusion of the screw-extruder and a co-operating photo-electric cell.

* * * * *